United States Patent
Fujii

(10) Patent No.: US 10,180,814 B2
(45) Date of Patent: Jan. 15, 2019

(54) USER TERMINAL, IMAGE PROCESSING DEVICE AND CLOUD SERVER TO IDENTIFY PLURAL USER INFORMATION TO EXECUTE AN IMAGE PROCESSING JOB UPON VALIDATING AN USER INFORMATION

(71) Applicant: Konica Minolta, Inc., Tokyo (JP)

(72) Inventor: Masato Fujii, Kyoto (JP)

(73) Assignee: Konica Minolta, Inc., Tokyo (JP)

( * ) Notice: Subject to any disclaimer, the term of this patent is extended or adjusted under 35 U.S.C. 154(b) by 47 days.

(21) Appl. No.: 15/182,261

(22) Filed: Jun. 14, 2016

(65) Prior Publication Data

US 2016/0364192 A1    Dec. 15, 2016

(30) Foreign Application Priority Data

Jun. 15, 2015 (JP) .................................. 2015-119937

(51) Int. Cl.

| | |
|---|---|
| *H04L 29/06* | (2006.01) |
| *G06F 3/12* | (2006.01) |
| *H04N 1/00* | (2006.01) |
| *G06K 15/02* | (2006.01) |
| *G06K 15/00* | (2006.01) |

(52) U.S. Cl.
CPC .......... *G06F 3/1238* (2013.01); *G06F 3/1222* (2013.01); *G06F 3/1287* (2013.01); *G06K 15/1806* (2013.01); *G06K 15/4095* (2013.01); *H04N 1/00244* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2013/0235418 A1* | 9/2013 | Tanaka | H04N 1/00228 358/1.15 |
| 2015/0160900 A1* | 6/2015 | Kang | G06F 3/1222 358/1.14 |

FOREIGN PATENT DOCUMENTS

JP     2008-083740 A    4/2008

* cited by examiner

*Primary Examiner* — Benny Q Tieu
*Assistant Examiner* — Haris Sabah
(74) *Attorney, Agent, or Firm* — Osha Liang LLP

(57) ABSTRACT

An image processing system includes: a cloud server that provides a service after identifying a user from first user information; an image processing device that executes a job after identifying the user from second user information, and execute the job; and a user terminal storing the second user information beforehand, wherein the cloud server includes: an access sensing processor that senses access from the user terminal; a user information validating processor that validates the first user information; and a job execution instructing processor that causes the user terminal to transmit a job containing the first and second user information to the image processing device, and the image processing device includes: a job receiving processor that receives the job transmitted; and a user information extracting processor that extracts the first and second user information from the job, and generate user reference information.

19 Claims, 13 Drawing Sheets

| No. | USER NAME 14a | CLOUD USER ID 14b | STATUS INFORMATION 14c | MFP INFORMATION 14d | MFP USER ID 14e |
|---|---|---|---|---|---|
| 1 | Yamada | yamada@****.com | UNPROCESSED | ###. ###. ###. ### | - |
| 2 | Tanaka | tanaka@****.com | UNPROCESSED | ###. ###. ###. ### | - |
| 3 | Suzuki | suzuki@****.com | UNPROCESSED | ###. ###. ###. ### | - |

FIG. 12

| No. | USER NAME | CLOUD USER ID | STATUS INFORMATION | MFP INFORMATION | MFP USER ID |
|---|---|---|---|---|---|
| 1 | Yamada | yamada@****.com | VALIDATED | ###.###.###.### | 1246023 |
| 2 | Tanaka | tanaka@****.com | VALIDATED | ###.###.###.### | 2461985 |
| 3 | Suzuki | suzuki@****.com | VALIDATED | ###.###.###.### | 8842155 |

| PRINT DATE | PRINTED FILE | USER ID | PRINT STATUS |
|---|---|---|---|
| 20150105 18:57:51 | yamada@****.com-10CDMWAEOW30NV47 | 1246023 | PRINT COMPLETED |
| 20150104 12:58:23 | tanaka@****.com-24FGJEAEYR67MP81 | 2461985 | PRINT COMPLETED |
| 20150104 09:13:11 | suzuki@****.com-73NFGUWEQT73FG42 | 8842155 | PRINT COMPLETED |

USER TERMINAL, IMAGE PROCESSING DEVICE AND CLOUD SERVER TO IDENTIFY PLURAL USER INFORMATION TO EXECUTE AN IMAGE PROCESSING JOB UPON VALIDATING AN USER INFORMATION

The entire disclosure of Japanese Patent Application No. 2015-119937 filed on Jun. 15, 2015 including description, claims, drawings, and abstract are incorporated herein by reference in its entirety.

BACKGROUND OF THE INVENTION

Field of the Invention

The present invention relates to an image processing system, a cloud server, an image processing device, and a program, and more particularly, to a technology for causing a cloud server and an image processing device to cooperate with each other.

Description of the Related Art

There has been a system that enables a server and an image processing device such as MFP (Multi-Function Peripherals) to perform image processing in cooperation with each other. According to JP 2008-83740 A, for example, second authentication information for using a server and first authentication information for using an image processing device are associated with each other, and are managed by the image processing device. After authenticating a user with the first authentication information, the image processing device issues an authentication request to the server, using the second authentication information associated with the first authentication information. By doing so, the image processing device cooperates with the server.

Meanwhile, a cloud server provided on the Internet these days can execute a job by cooperating with an image processing device provided in a local environment such as an office. For example, a cloud server can acquire, via a network, image data generated by an image processing device executing a scan job, and store the image data into the folder of the user who has instructed the image processing device to execute the scan job. In accordance with a print instruction from a user, a cloud server can also transmit the image data stored in the folder of the user to an image processing device, and cause the image processing device to execute a print job.

However, user information such as user IDs being managed by a cloud server is normally different from user information for using an image processing device installed in a local environment such as an office. To execute a job in cooperation with an image processing device, a cloud server needs to convert the user information registered in the image processing device into the user information registered in the cloud server, or convert the user information registered in the cloud server into the user information registered in the image processing device. Therefore, the user information registered in the image processing device and the user information registered in the cloud server need to be associated with each other beforehand and be managed in the associated state, as disclosed in JP 2008-83740 A.

When all the workers at an office starts using a cloud server at once, for example, a large amount of labor is required in associating the user information about all the workers registered in the cloud server with the user information about all the workers registered beforehand in an image processing device. If such a task is assigned to the manager of the image processing device, the work load on the manager becomes extremely large. In such a case, it is difficult for the manager to efficiently work, and the manager is likely to make mistakes, resulting in a possibility of a wrong associating operation.

In view of this, there is a demand for a technique for associating user information registered in a cloud server with user information in an image processing device, without any increase in the work load on the manager of the image processing device at the start of use of the cloud server. According to an example of such a method, each individual user of an image processing device performs an operation to associate the user information registered in a cloud server and the user information for using the image processing device with each other, for example. However, some of the users might find it troublesome to do such a task, and therefore, put off doing it. Some of the users might perform wrong associating operations. Further, if the task is assigned to each individual user, the manager might receive numerous inquiries, and the work load on the manager will not be effectively reduced.

SUMMARY OF THE INVENTION

An image processing system, a cloud server, an image processing device, and a program can perform an associating operation without making the user aware of the operation and associate user information in the cloud server and user information in the image processing device with each other, while reducing the work load on both the manager and the user.

According to an aspect, an image processing system reflecting one or more embodiments of the present invention comprises: a cloud server configured to provide a service after identifying a user from first user information assigned to each user, the cloud server being provided on the Internet; an image processing device configured to execute a job after identifying the user from second user information assigned to each user, and execute the job in cooperation with the cloud server; and a user terminal storing the second user information beforehand, wherein the cloud server includes: an access sensing unit configured to sense access from the user terminal; a user information validating unit configured to validate the first user information, as the access from the user terminal is sensed by the access sensing unit; and a job execution instructing unit configured to cause the user terminal to transmit a job containing the first user information and the second user information to the image processing device, by transmitting a job execution instruction containing the first user information to the user terminal when the first user information is validated by the user information validating unit, and the image processing device includes: a job receiving unit configured to receive the job transmitted from the user terminal; and a user information extracting unit configured to extract the first user information and the second user information from the job received by the job receiving unit, and generate user reference information associating the first user information and the second user information with each other.

According to one or more embodiments of the present invention, the job execution instructing unit activates a driver program in the user terminal by transmitting the job execution instruction to the user terminal, and causes the driver program to automatically generate the job containing the first user information and the second user information, and transmit the job to the image processing device.

According to one or more embodiments of the present invention, the image processing device further includes an information transmitting unit configured to transmit the user reference information to the cloud server, and the cloud server further includes: a user information managing unit configured to acquire the user reference information from the image processing device, and generate and manage user management information associating the first user information and the second user information with each other in accordance with the user reference information; and a user information identifying unit configured to identify the second user information corresponding to the first user information or the first user information corresponding to the second user information in accordance with the user management information, when the cloud server executes the job in cooperation with the image processing device.

According to one or more embodiments of the present invention, when transmitting the job execution instruction containing the first user information to the user terminal, the job execution instructing unit generates temporary identification information, and transmits a job execution instruction further containing the identification information to the user terminal, to cause the user terminal to transmit a job containing the first user information, the second user information, and the identification information to the image processing device, when the job received by the job receiving unit contains the identification information, the user information extracting unit adds the identification information to the user reference information, and when the user reference information acquired from the image processing device contains the identification information, and the identification information is legitimate, the user information managing unit generates the user management information associating the first user information and the second user information with each other.

According to one or more embodiments of the present invention, as the user reference information is generated by the user information extracting unit, the information transmitting unit accesses the cloud server and transmits the user reference information to the cloud server.

According to one or more embodiments of the present invention, the user information managing unit acquires the user reference information from the image processing device by regularly accessing the image processing device.

According to one or more embodiments of the present invention, after transmitting the job execution instruction to the user terminal, the user information managing unit acquires the user reference information from the image processing device by accessing the image processing device at a predetermined time.

According to an aspect, a cloud server providing a service after identifying a user from first user information assigned to each user and executing a job in cooperation with an image processing device in a local network and being provided on the Internet, reflecting one or more embodiments of the present invention comprises: an access sensing unit configured to sense access from a user terminal being operated by the user to whom the first user information is assigned; a user information validating unit configured to validate the first user information, as the access from the user terminal is sensed by the access sensing unit; and a job execution instructing unit configured to cause the user terminal to transmit a job containing the first user information and second user information to the image processing device, by transmitting a job execution instruction containing the first user information to the user terminal when the first user information is validated by the user information validating unit, the second user information being designed for causing the image processing device to execute the job.

According to one or more embodiments of the present invention, the job execution instructing unit activates a driver program in the user terminal by transmitting the job execution instruction to the user terminal, and causes the driver program to automatically generate the job containing the first user information and the second user information, and transmit the job to the image processing device.

According to one or more embodiments of the present invention, the cloud server further comprises: a user information managing unit configured to acquire user reference information associating the first user information and the second user information with each other from the image processing device after causing the user terminal to transmit the job containing the first user information and the second user information to the image processing device, and generate and manage user management information associating the first user information and the second user information with each other in accordance with the user reference information; and a user information identifying unit configured to identify the second user information corresponding to the first user information or the first user information corresponding to the second user information in accordance with the user management information, when the cloud server executes the job in cooperation with the image processing device.

According to one or more embodiments of the present invention, when transmitting the job execution instruction containing the first user information to the user terminal, the job execution instructing unit generates temporary identification information, and transmits a job execution instruction further containing the identification information to the user terminal, to cause the user terminal to transmit a job containing the first user information, the second user information, and the identification information to the image processing device, and when the user reference information acquired from the image processing device contains the identification information, and the identification information is legitimate, the user information managing unit generates the user management information associating the first user information and the second user information with each other.

According to one or more embodiments of the present invention, the user information managing unit acquires the user reference information from the image processing device by regularly accessing the image processing device.

According to one or more embodiments of the present invention, after transmitting the job execution instruction to the user terminal, the user information managing unit acquires the user reference information from the image processing device by accessing the image processing device at a predetermined time.

According to an aspect, an image processing device executing a job in cooperation with a cloud server providing a service after identifying a user from first user information assigned to each user and executing the job after identifying the user from second user information assigned to each user, reflecting one or more embodiments of the present invention comprises: a job receiving unit configured to receive the job transmitted from a user terminal being operated by the user; and a user information extracting unit configured to extract the first user information and the second user information from the job received by the job receiving unit, and generate user reference information associating the first user information and the second user information with each other.

According to one or more embodiments of the present invention, when the job received by the job receiving unit contains temporary identification information, the user information extracting unit adds the identification information to the user reference information.

According to one or more embodiments of the present invention, the image processing device further comprises an information transmitting unit configured to transmit the user reference information to the cloud server.

According to one or more embodiments of the present invention, as the user reference information is generated by the user information extracting unit, the information transmitting unit accesses the cloud server and transmits the user reference information to the cloud server.

According to an aspect, there is provided a non-transitory recording medium storing a computer readable program to be executed in a cloud server providing a service after identifying a user from first user information assigned to each user and executing a job in cooperation with an image processing device in a local network, the cloud server being provided on the Internet, the program reflecting one or more embodiments of the present invention causing the cloud server to carry out: a) the step of sensing access from a user terminal being operated by the user to whom the first user information is assigned; b) the step of validating the first user information, as the access from the user terminal is sensed in the step a); and c) the step of causing the user terminal to transmit a job containing the first user information and second user information to the image processing device, by transmitting a job execution instruction containing the first user information to the user terminal when the first user information is validated in the step b), the second user information being designed for causing the image processing device to execute the job.

According to an aspect, there is provided anon-transitory recording medium storing a computer readable program to be executed in an image processing device executing a job in cooperation with a cloud server providing a service after identifying a user from first user information assigned to each user, the image processing device executing the job after identifying the user from second user information assigned to each user, the program reflecting one or more embodiments of the present invention causing the image processing device to carry out: a) the step of receiving the job transmitted from a user terminal being operated by the user; and b) the step of extracting the first user information and the second user information from the job received in the step a), and generating user reference information associating the first user information and the second user information with each other.

BRIEF DESCRIPTION OF THE DRAWINGS

The above and other advantages and features of one or more embodiments of the present invention will become more fully understood from the detailed description given hereinbelow and the appended drawings which are given by way of illustration only, and thus are not intended as a definition of the limits of one or more embodiments of the present invention, and wherein:

FIG. 3 is a table showing an example of user management information;

FIG. 12 is a table showing an example of the user management information updated by a user information managing unit;

FIG. 15 is a table showing an example of job history information that can be used as the user reference information.

DETAILED DESCRIPTION OF EMBODIMENTS

Figure 1:
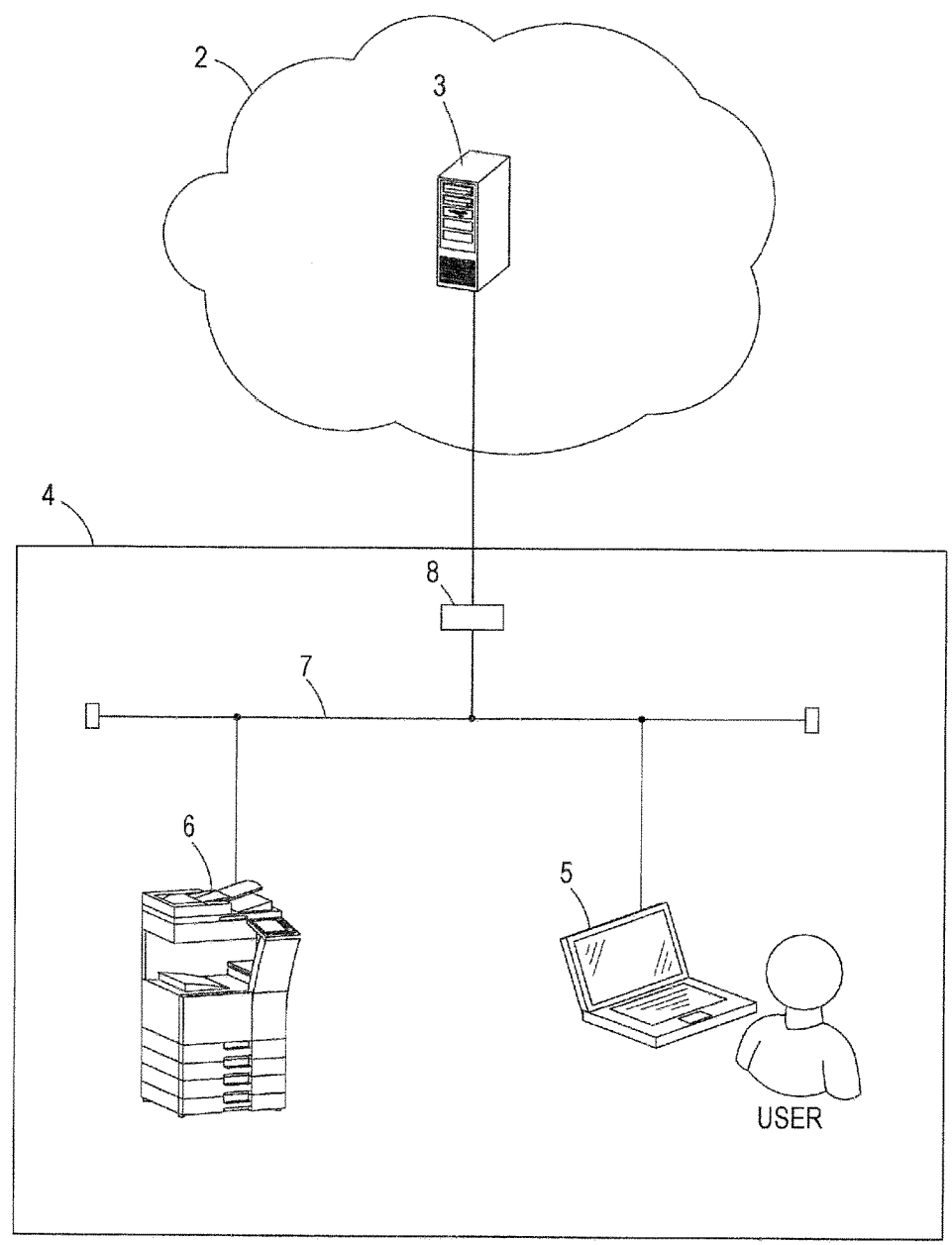
FIG. 1 is a diagram showing an example configuration of an image processing system.

Hereinafter, embodiments of the present invention will be described in detail with reference to the drawings. However, the scope of the invention is not limited to the illustrated examples. In embodiments of the present invention described below, like components are denoted by like reference numerals, and the same explanation thereof will not be unnecessarily repeated.

FIG. 1 is a diagram showing an example configuration of an image processing system 1 according to one or more embodiments of the present invention. In this image processing system 1, a cloud server 3, a user terminal 5, and an image processing device 6 are connected to one another via a network so that they can communicate with one another. The cloud server 3 is provided on the Internet 2, and provides cloud services via the Internet 2. Various services are to be provided by the cloud server 3, and one of those services is a storage service of storing document data and image data, for example.

The user terminal 5 and the image processing device 6 are provided in a local environment 4 such as an office. The user terminal 5 is an information processing terminal that can be operated by a user, and may be formed with a personal computer (PC), for example. The image processing device 6 is formed with an MFP or the like, and has multiple functions such as a scan function, a print function, a copy function, and a facsimile function. The image processing device 6 activates a selected one of those functions, and executes a job designated by a user.

A local network 7, such as LAN (Local Area Network), is provided in the local environment 4, and the user terminal 5 and the image processing device 6 are connected to the local network 7. A communications relay device 8, such as a router, is also connected to the local network 7, and the user terminal 5 and the image processing device 6 can communicate with the cloud server 3 on the Internet 2 via the communications relay device 8. The local network 7 is not necessarily for communications via cables, but may be for wireless communications.

In the image processing system 1, when a user in the local environment 4 starts using a cloud service to be provided by the cloud server 3, user information (first user information) about the user, such as the cloud user ID of the user, is registered in the cloud server 3 by the service provider. The user first accesses the cloud server 3 by operating the user terminal 5, and conducts an introduction process for starting to use the cloud service by reading the terms of use of the cloud service and setting a password. As the user completes the introduction process, the cloud server 3 validates the user information about the user, such as the cloud user ID. When sensing access from the user terminal 5 after the validation of the user information, the cloud server 3 identifies the user in accordance with the user information such as the cloud user ID, and provides the identified user with the designated service.

Meanwhile, in the image processing device 6, user information (second user information) such as an MFP user ID for enabling a user to use the image processing device 6 is registered beforehand for each user. When a user uses the image processing device 6, the user logs in to the image processing device 6 by using the user information such as the MFP user ID, to cause the image processing device 6 to execute a job. In the case of a print job, for example, the image processing device 6 extracts user information such as an MFP user ID from the print job received via the local network 7. The image processing device 6 identifies the user from the user information extracted from the print job, and executes the print job.

In this embodiment, when the cloud server 3 starts providing a service, the cloud server 3 and the image processing device 6 can cooperate to execute a job. For example, a user accesses the cloud server 3 by operating the user terminal 5, designates document data or image data stored in the cloud server 3, and instructs the image processing device 6 to print it out. In accordance with the data designated by the user, the cloud server 3 generates a print job that can be executed by the image processing device 6, and transmits the print job to the image processing device 6. In some other case, a user operates and instructs the image processing device 6 to upload image data read with the scan function onto the cloud server 3, for example. In that case, the image processing device 6 transmits the image data generated by executing a scan job, to the cloud server 3. The cloud server 3 in turn stores the image data transmitted from the image processing device 6 into a folder that can be used by the user that has issued the job execution.

To enable the above cooperative operations between the cloud server 3 and the image processing device 6, the image processing system 1 of this embodiment generates information that associates beforehand the first user information such as cloud user IDs with the second user information such as MFP user IDs, and manages the information in the cloud server 3 and/or the image processing device 6. As the first user information and the second user information are managed in conjunction with each other, the first user information can be converted into the second user information, or the second user information can be converted into the first user information. Thus, there is no need for each user to input the individual user information, and user-friendliness becomes higher accordingly.

When a user performs the above described introduction process for starting to use a cloud service, the image processing system 1 of this embodiment executes a process for associating the first user information such as the cloud user ID with the second user information such as the MFP user ID, and associates the first user information with the second user information, without making the user aware of the process. In this manner, the first user information and the second user information can be associated with each other, without any load being imposed on the manager or the user of the image processing device 6. In the description below, this image processing system 1 will be described in detail. In the example case described below, the information that associates the first user information and the second user information with each other is managed in the cloud server 3.

Figure 2:
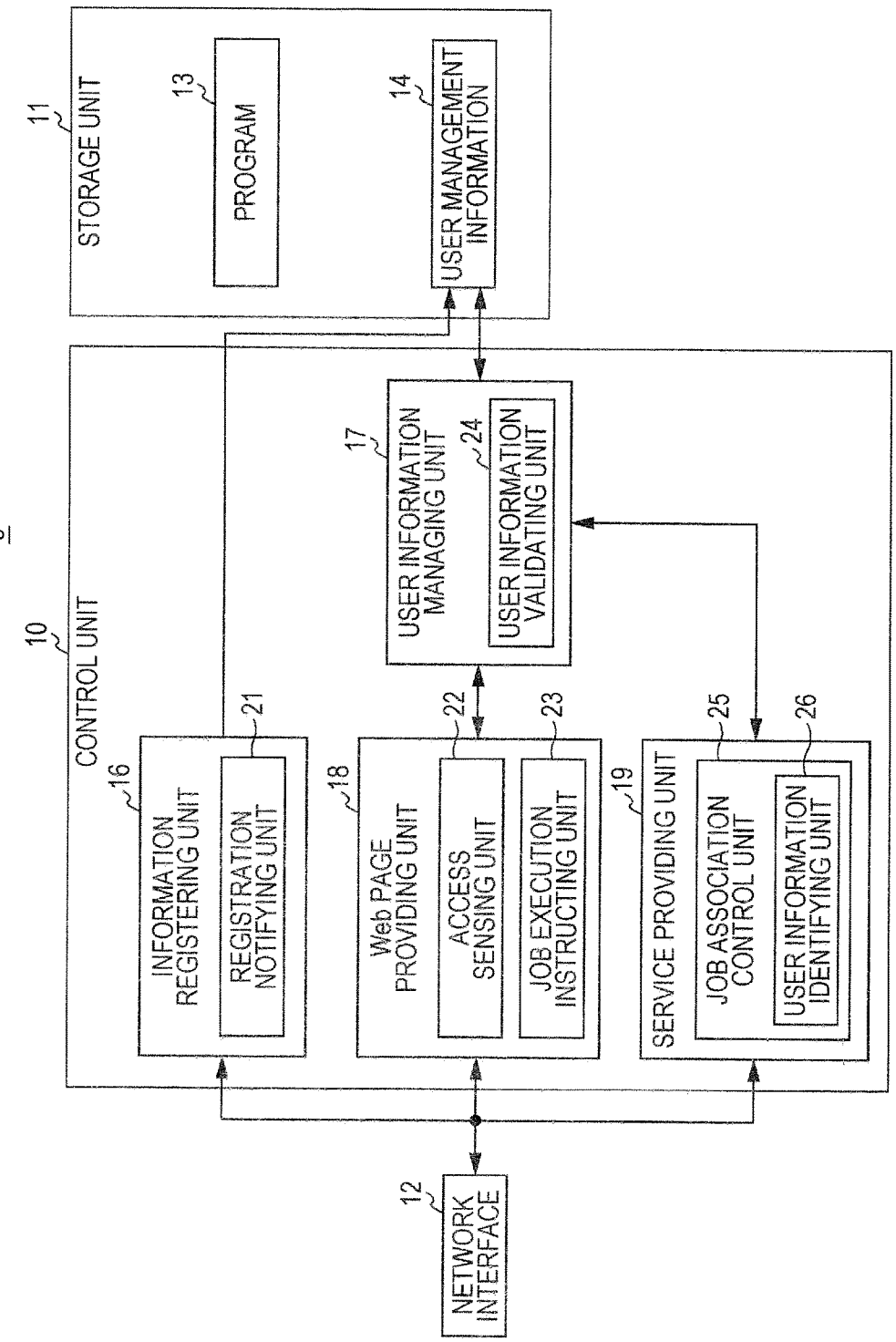
FIG. 2 is a block diagram showing an example hardware configuration and an example functional structure of a cloud server.

FIG. 2 is a block diagram showing an example hardware configuration and an example functional structure of the cloud server 3. The cloud server 3 includes a control unit 10 formed with a CPU and memories, a storage unit 11 formed with a nonvolatile storage medium such as a hard disk drive (HDD), and a network interface 12. The network interface 12 is an interface that connects the cloud server 3 to a network, and communicates with the user terminal 5 and the image processing device 6. The storage unit 11 stores a program 13 to be executed by the CPU of the control unit 10, and user management information 14 in which the information about the users using the cloud service is registered. Although not shown in the drawing, folders for the respective users are provided in the storage unit 11, and the document data and the image data to be used by the users are stored in the respective folders.

As the CPU reads the program 13 from the storage unit 11 and executes it, the control unit 10 functions as an information registering unit 16, a user information managing unit 17, a web page providing unit 18, and a service providing unit 19.

The information registering unit 16 is a processing unit (i.e., processor) that registers the information about new users to cloud services into the user management information 14. The information registering unit 16 registers the information about a new user into the user management information 14, in accordance with information that is input from outside via the network interface 12, for example. As the information about a new user is registered into the user management information 14 by the information registering unit 16, a new account for providing the new user with services is created.

FIG. 3 is a table showing an example of the user management information 14. As shown in FIG. 3, the user management information 14 includes user names 14a, cloud user IDs 14b that are the first user information for enabling the users to use cloud services, status information 14c indicating whether the cloud user ID validation process has been completed, MFP information 14d indicating the address or the like of the image processing device 6 to be used by the users, and MFP user IDs 14e that are the second user information for enabling the users to use the image processing device 6. These pieces of information are registered in the user management information 14.

When registering a new user, the information registering unit 16 registers the user name 14a, the cloud user ID 14b, and the MFP information 14d, in accordance with information that is input from outside. For example, the names or the like of the users are registered as the user names 14a. The information for identifying the individual users is registered as the cloud user IDs 14b. In this embodiment, e-mail addresses of the users are registered as the cloud user IDs 14b, for example. Information such as the IP address of the image processing device 6 is registered as the MFP information 14d. When registering a new user, the information registering unit 16 registers information indicating that the cloud user ID validation process has not been completed, as the status information 14c. At the time of the registration of the new user, the MFP user ID for enabling the new user to use the image processing device 6 is still unknown, and therefore, nothing is registered into the area for the MFP user ID 14e.

As shown in FIG. 2, the information registering unit 16 includes a registration notifying unit 21. The registration notifying unit 21 is a processing unit that starts functioning after a new user is registered into the user management information 14 by the information registering unit 16, and notifies that a new account for the new user has been created. To notify that a new account has been created, the registration notifying unit 21 automatically transmits an e-mail message to the e-mail address of the new user, for example.

The user information managing unit 17 is a processing unit that manages the user management information 14 stored in the storage unit 11. The user information managing unit 17 includes a user information validating unit 24. The user information validating unit 24 validates the cloud user ID of the new user registered by the information registering unit 16, so that the new user is enabled to use cloud services.

After the information about the new user is registered into the user management information 14 by the information registering unit 16, the web page providing unit 18 functions as a processing unit at the time of the first access form the new user, and provides a web page for the new user to perform the introduction process to read the terms of use of the cloud services and set a password. As the information about the new user is registered into the user management information 14 by the information registering unit 16, the web page providing unit 18 creates a web page specially for the new user to perform the introduction process, and then stands by until there is access from the new user.

The web page providing unit 18 includes an access sensing unit 22 that senses access from the user terminal 5, and a job execution instructing unit 23 that instructs the user terminal 5 to execute a job. The access sensing unit 22 is a processing unit that senses the first access from the new user. Sensing access from the user terminal 5 being operated by the new user, the access sensing unit 22 outputs the web page created specially for the new user to the user terminal 5, and accepts the introduction process performed by the new user. After the introduction process is performed by the new user, the access sensing unit 22 notifies the user information validating unit 24 of the completion of the introduction process. The user information validating unit 24 in turn validates the cloud user ID of the new user by changing the status information 14c corresponding to the new user to information indicating "validated", so that the new user is enabled to use cloud services.

The job execution instructing unit 23 is a processing unit that instructs the user terminal 5 to execute a job when the new user performs a predetermined operation while conducting the introduction process at the time of the first access. To instruct the user terminal 5 to execute a job, the job execution instructing unit 23 generates a job execution instruction including the cloud user ID of the new user, and transmits the job execution instruction to the user terminal 5. Further, to instruct the user terminal 5 to execute a job, the job execution instructing unit 23 may generate temporary identification information such as a temporary "token", and transmit a job execution instruction further including the temporary identification information to the user terminal 5.

After the job execution instruction is transmitted to the user terminal 5 by the job execution instructing unit 23, the user information managing unit 17 communicates with the image processing device 6 being used by the user, to acquire the information associating the cloud user ID with the MFP user ID from the image processing device 6. In accordance with the information acquired from the image processing device 6, the user information managing unit 17 additionally records the MFP user ID of the user into the area for the MFP user ID 14e of the user management information 14, and manages the cloud user ID of the user and the MFP user ID of the user associated with each other in the user management information 14.

The service providing unit 19 is a processing unit that provides cloud services to a user for whom the cloud user ID validation process has been performed by the user information validating unit 24. The service providing unit 19 includes a job association control unit 25. The job association control unit 25 controls a job to be executed in cooperation with the image processing device 6. The job association control unit 25 includes a user information identifying unit 26. In accordance with the user management information 14 being managed by the user information managing unit 17, the user information identifying unit 26 converts the cloud user ID into the MFP user ID, or converts the MFP user ID into the cloud user ID, to exchange appropriate user information with the image processing device 6.

For example, when a user designates document data or image data stored in the storage unit 11 and instructs the image processing device 6 to print it out, the job association control unit 25 generates a print job that can be executed by the image processing device 6 in accordance with the designated data. At this point of time, the user information identifying unit 26 reads the MFP user ID associated with the cloud user ID of the user who has logged in to the cloud server 3 by referring to the user management information 14, and adds the MFP user ID to the print job to be transmitted to the image processing device 6. The job association control unit 25 then transmits the print job accompanied by the MFP user ID, to the image processing device 6.

When receiving image data generated by the scan function from the image processing device 6, the job association control unit 25 also causes the user information identifying unit 26 to function. By referring to the user management information 14, the user information identifying unit 26 identifies the cloud user ID associated with the MFP user ID attached to the image data, identifies the user who has uploaded the image data, and stores the image data into a folder that can be used by the user.

Figure 4:
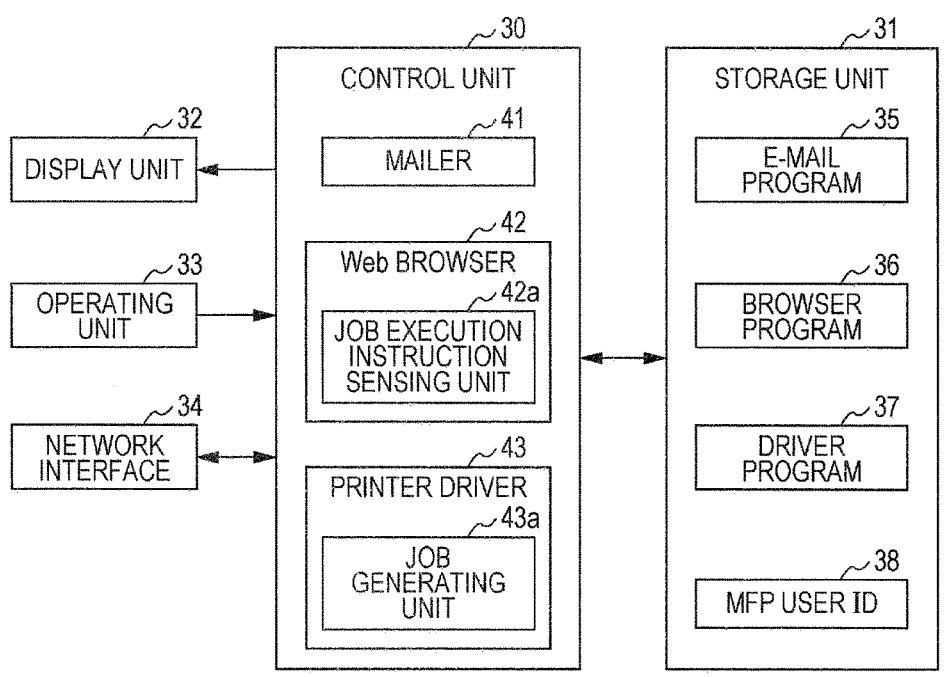
FIG. 4 is a block diagram showing an example hardware configuration and an example functional structure of a user terminal.

FIG. 4 is a block diagram showing an example hardware configuration and an example functional structure of the user terminal 5. The user terminal 5 includes: a control unit 30 formed with a CPU and memories; a storage unit 31 formed with a nonvolatile storage medium such as a hard disk drive (HDD) or a solid-state drive (SSD); a display unit 32 formed with a color liquid crystal display or the like; an operating unit 33 formed with a keyboard, a mouse, a touch panel sensor provided on the screen of the display unit 32, and the like; and a network interface 34. The network interface 34 is an interface that connects the user terminal 5 to the local network 7 in a wired or wireless manner, and communicates with the cloud server 3 and the image processing device 6. The storage unit 31 stores an e-mail program 35, a browser program 36, and a driver program 37 that are to be executed by the CPU of the control unit 30, and also stores an MFP user ID 38 that is the second user information for enabling the user to use the image processing device 6.

As the CPU reads the e-mail program 35 from the storage unit 31 and executes it, the control unit 30 functions as a mailer (MUA) 41. The mailer 41 is designed for transmission and reception of e-mail messages via the network interface 34.

As the CPU reads the browser program 36 from the storage unit 31 and executes it, the control unit 30 also functions as a web browser 42. The web browser 42 accesses an URL (Uniform Resource Locator) designated by the user via the network interface 34, acquires a web page from the URL, and causes the display unit 32 to display the web page. The web browser 42 includes a job execution instruction sensing unit 42a. Sensing a job execution instruction transmitted from the server being accessed by the web browser 42, the job execution instruction sensing unit 42a causes the CPU to execute the driver program 37.

As the CPU executes the driver program 37, the control unit 30 functions as a printer driver 43. The printer driver 43 includes a job generating unit 43a that generates a print job for outputting a print-out, and outputs the print job generated by the job generating unit 43a to the image processing device 6. When generating a print job in accordance with a job execution instruction, the job generating unit 43a generates a print job including the information contained in the job execution instruction. The job generating unit 43a also reads the MFP user ID 38 from the storage unit 31, and adds the MFP user ID 38 as additional information to the print job. With this, the image processing device 6 can identify the user from the MFP user ID 38 attached to the print job.

Figure 5:
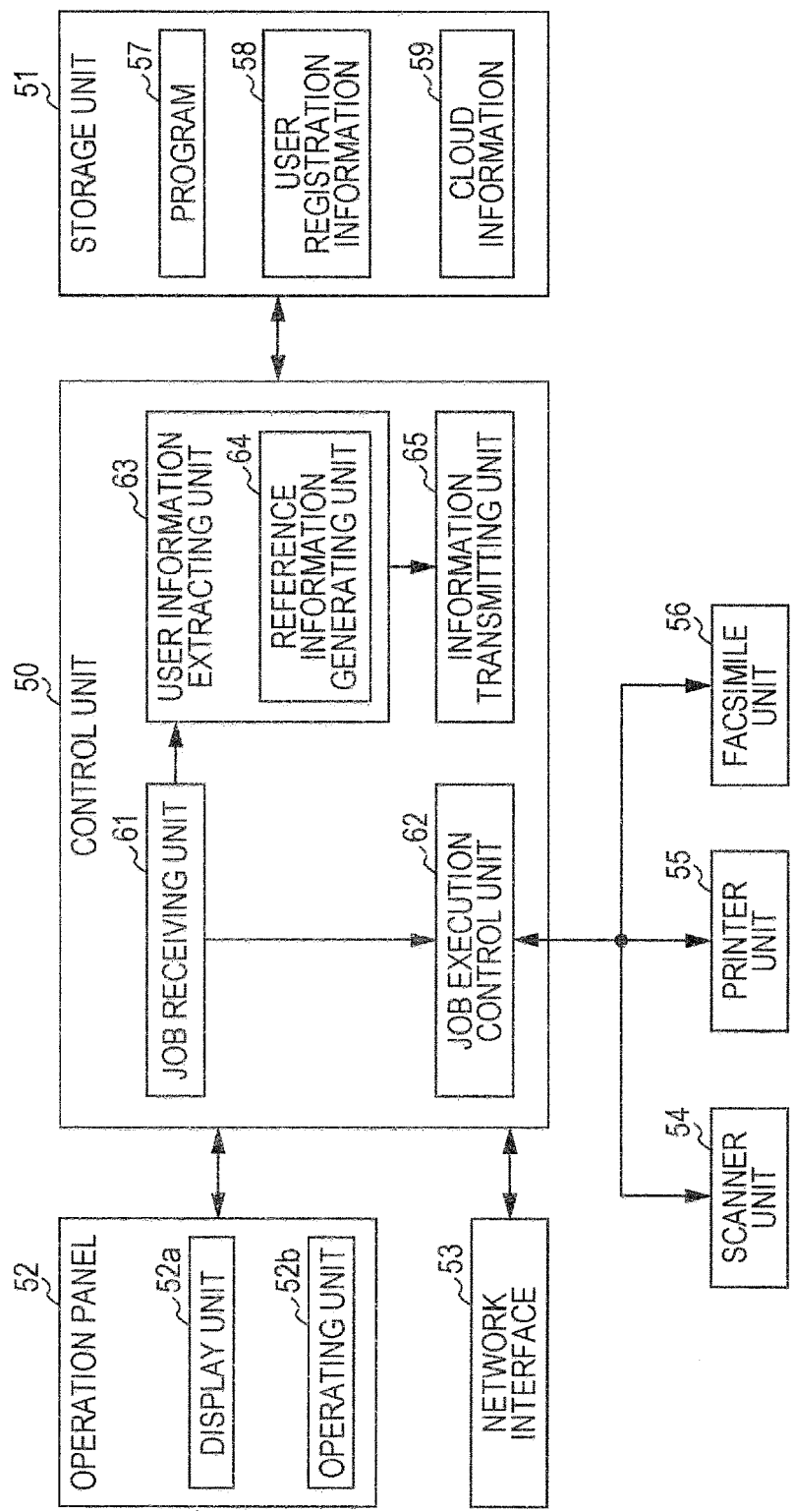
FIG. 5 is a block diagram showing an example hardware configuration and an example functional structure of an image processing device.

FIG. 5 is a block diagram showing an example hardware configuration and an example functional structure of the image processing device 6. The image processing device 6 includes a control unit 50, a storage unit 51, an operation panel 52, a network interface 53, a scanner unit 54, a printer unit 55, and a facsimile unit 56. The control unit 50 is formed with a CPU and memories. As the CPU reads a program 57 from the storage unit 51 and executes it, the control unit 50 controls operations of the respective components. The storage unit 51 is formed with a nonvolatile storage medium such as a hard disk drive (HDD), and stores the program 57, user registration information 58, and cloud information 59. The operation panel 52 is a user interface to be used by a user when operating the image processing device 6. The operation panel 52 includes a display unit 52a formed with a color liquid crystal display, and an operating unit 52b formed with a touch panel sensor or the like provided on the screen of the display unit 52a. The network interface 53 is an interface that connects the image processing device 6 to the local network 7, and communicates with the cloud server 3 and the user terminal 5.

The scanner unit 54 operates when a scan job is executed in the image processing device 6, and generates image data by reading an image of a document that is set by a user. The printer unit 55 operates when a print job is executed in the image processing device 6. The printer unit 55 forms an image on a printing medium such as a printing paper sheet in accordance with input image data, and outputs a print-out. The facsimile unit 56 operates when a facsimile job is executed in the image processing device 6, and sends and receives facsimile data via a public telephone network (not shown).

The user registration information 58 stored in the storage unit 51 is information in which the information about the users using the image processing device 6 is registered. For example, the user registration information 58 is information in which the MFP user IDs of the respective users are registered. The cloud information 59 is information in which the address of the cloud server 3 and the like are registered beforehand so that the image processing device 6 can upload image data and the like onto the cloud server 3.

As the CPU executes the program 57, the control unit 50 functions as a job receiving unit 61, a job execution control unit 62, a user information extracting unit 63, and an information transmitting unit 65.

The job receiving unit 61 is a processing unit that receives a job transmitted from the user terminal 5 or the cloud server 3 via the network interface 53. Receiving a job via the network interface 53, the job receiving unit 61 extracts the user information attached to the job, such as an MFP user ID. The job receiving unit 61 then determines whether the extracted user information is registered in the user registration information 58. By doing so, the job receiving unit 61 performs user authentication to determine whether the corresponding user is a legitimate user. If the user is a legitimate user, the job receiving unit 61 accepts the received job as a legitimate job. When accepting the received job as a legitimate job, the job receiving unit 61 outputs the job to the job execution control unit 62.

The job execution control unit 62 controls execution of the job accepted by the job receiving unit 61. Specifically, the job execution control unit 62 controls execution of the job accepted by the job receiving unit 61, by driving the scanner unit 54, the printer unit 55, and the facsimile unit 56. If the accepted job is a print job, for example, the job execution control unit 62 controls the printing based on the image data included in the print job, by driving the printer unit 55 in accordance with the image data.

When a legitimate print job is accepted by the job receiving unit 61, the user information extracting unit 63 starts functioning. The user information extracting unit 63 determines whether the two pieces of user information, which are a cloud user ID and an MFP user ID, are included in the print job accepted by the job receiving unit 61. If both a cloud user ID and an MFP user ID are included, the user information extracting unit 63 extracts the two pieces of user information from the print job. The user information extracting unit 63 also determines whether the print job received by the job receiving unit 61 is accompanied by identification information such as a temporary token. If the print job is accompanied by identification information, the user information extracting unit 63 extracts the identification information.

The user information extracting unit 63 includes a reference information generating unit 64. When the two pieces user information, a cloud user ID and an MFP user ID, are extracted by the user information extracting unit 63, the reference information generating unit 64 starts functioning, and generates user reference information that associates the two pieces of user information with each other. Specifically, the user reference information is the information in which the cloud user ID and the MFP user ID of the user who has issued the job execution instruction are associated with each other. In a case where identification information such as a temporary token is extracted by the user information extracting unit 63, the reference information generating unit 64 further attaches the identification information to the user reference information. The reference information generating unit 64 then outputs the user reference information to the information transmitting unit 65.

The information transmitting unit 65 is a processing unit that transmits the user reference information generated by the user information extracting unit 63, to the cloud server 3. For example, the information transmitting unit 65 refers to the cloud information 59 as soon as acquiring the user reference information from the user information extracting unit 63. The information transmitting unit 65 accesses the cloud server 3 in accordance with the cloud information 59, and transmits the user reference information to the cloud server 3.

Figure 6:
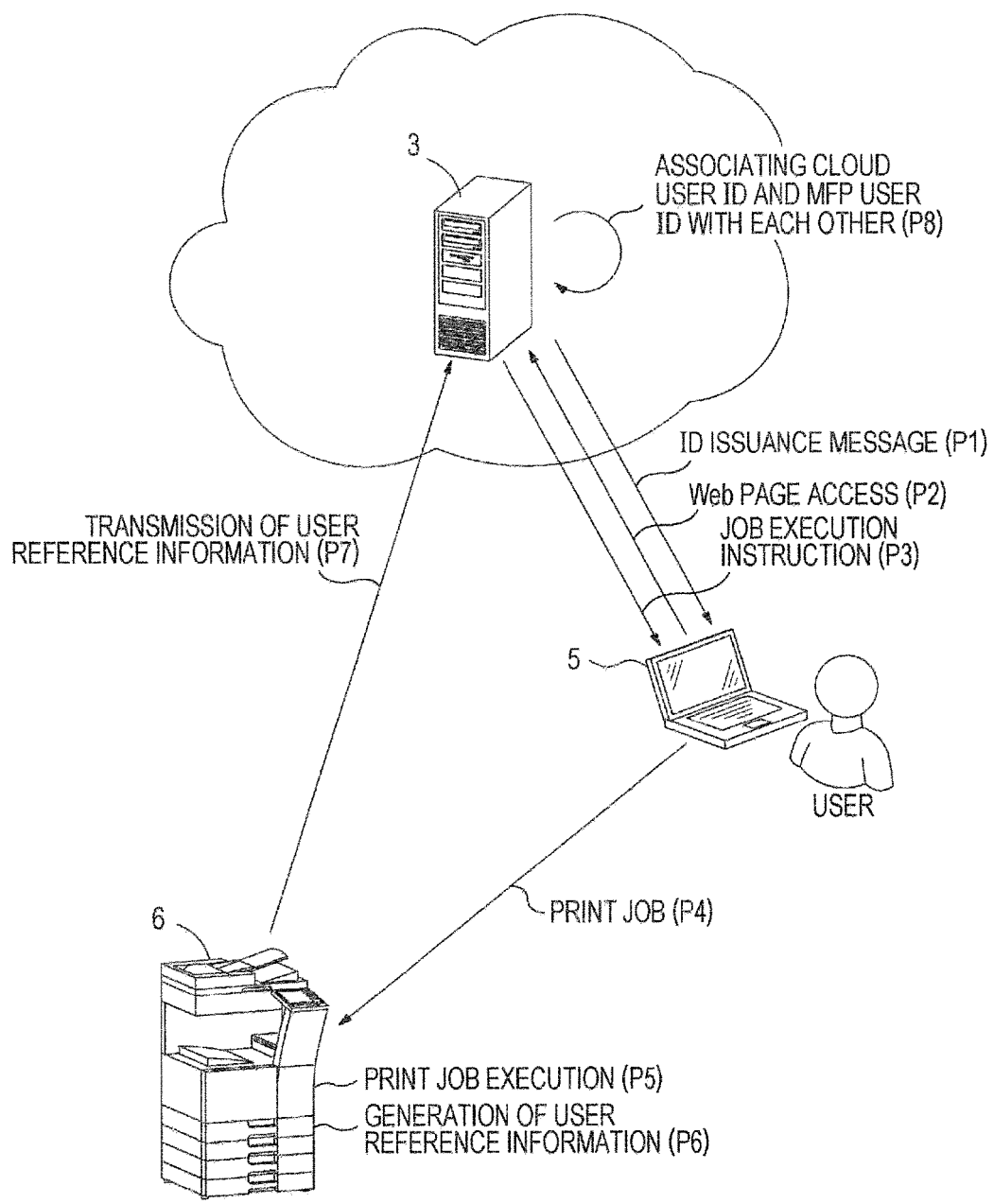
FIG. 6 is a diagram showing a process to be performed to associate first user information and second user information with each other in the image processing system.

FIG. 6 is a diagram showing a process to be performed to manage a cloud user ID and an MFP user ID associated with each other in the image processing system 1 designed as described above.

Figure 7:
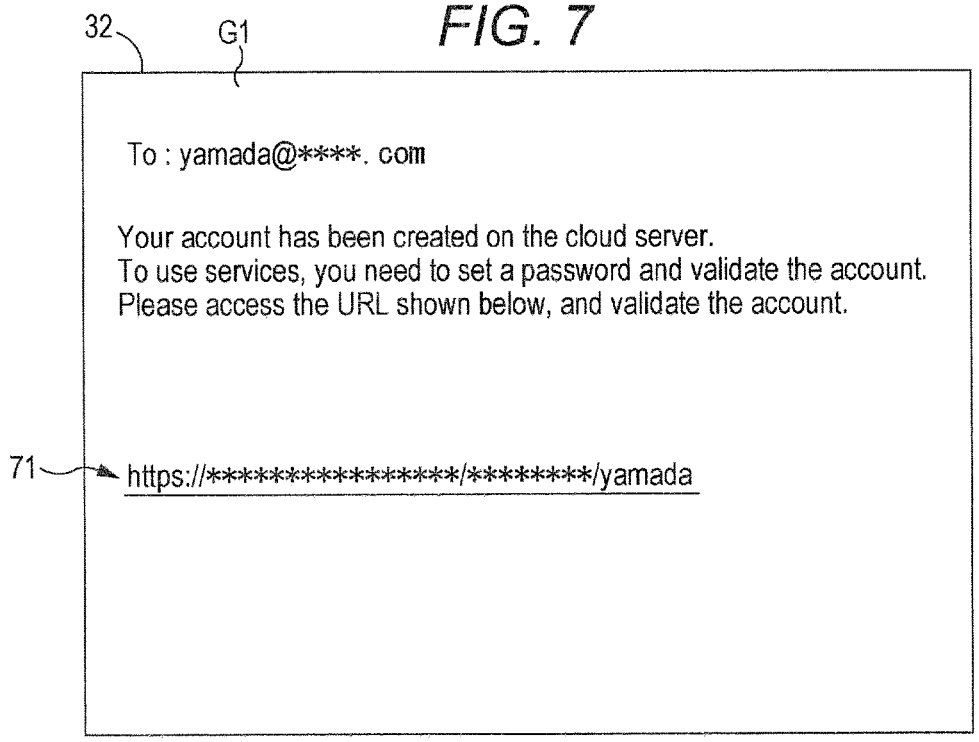
FIG. 7 is a diagram showing an example of the screen of the user terminal on which an ID issuance message is displayed.

First, the cloud server 3 registers the information about a new user to use cloud services, and transmits an ID issuance message to an e-mail address of the new user (process P1). By activating the mailer 41 through his/her own user terminal 5, the user receives the ID issuance message, and causes the display unit 32 to display the contents of the ID issuance message. FIG. 7 is a diagram showing an example of the screen G1 of the display unit 32 of the user terminal 5 on which the ID issuance message is displayed. As shown in FIG. 7, the body of the ID issuance message includes access information 71 that is the first access destination to be accessed by the user to perform the introduction process. In the access information 71, a different access destination is defined for each user. When the user selects the access information 71 by operating the operating unit 33, the user terminal 5 automatically activates the web browser 42. The user terminal 5 then connects to the cloud server 3 in accordance with the access information 71, and accesses the user-specific web page provided by the cloud server 3 (process P2). The web browser 42 activated by the user terminal 5 acquires the web page from the cloud server 3, and causes the display unit 32 to display the web page. The web browser 42 also transmits operation information based on a user operation performed on the web page, to the cloud server 3. That is, the web browser 42 causes the display unit 32 to display the web page provided from the cloud server 3, and thus causes the user to perform the first introduction process to use cloud services.

Figure 8:
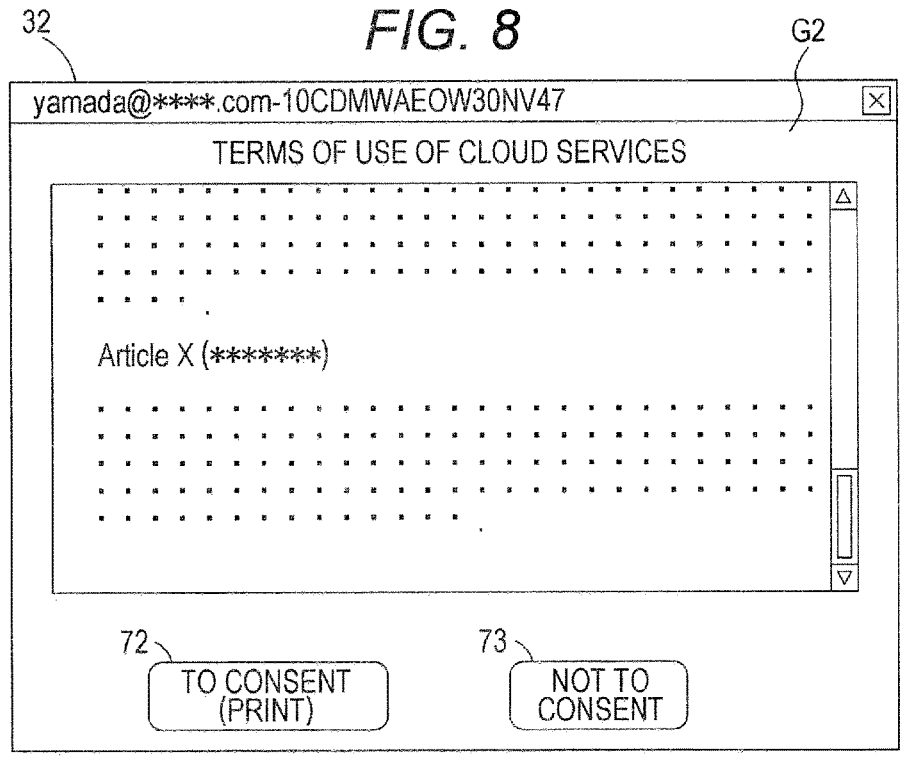
FIG. 8 is a diagram showing an example of the screen that is displayed on the user terminal when a user performs the introduction process.

FIG. 8 is a diagram showing an example of the screen G2 that is displayed on the display unit 32 of the user terminal 5 when the user performs the introduction process. On this screen G2, the terms of use of the cloud services are displayed. At a bottom portion of the screen G2, a button 72 to be operated by the user to consent to the terms of use, and a button 73 to be operated by the user not to consent to the terms of use are displayed. The screen G2 is created by the web page providing unit 18 of the cloud server 3, and is transmitted to the user terminal 5. When the user operates the button 73 not to consent to the terms of use, the introduction process does not progress, and use of any cloud service cannot be started. When the user wishes to start using the cloud services, the user needs to operate the button 72 to consent to the terms of use, and proceed with and complete the introduction process.

In this embodiment, the button 72 for the user to proceed with the introduction process also serves as the button to issue a print job, as shown in FIG. 8. Specifically, when the user operates the button 72 to consent to the terms of use and proceed with the introduction process, the operation also serves as a print instruction for the user to print out the screen G2. As the button 72 is operated by the user, the operation information is transmitted from the user terminal 5 to the cloud server 3. When the web page providing unit 18 of the cloud server 3 senses the operation of the button 72 by the user, the job execution instructing unit 23 is made to function and transmit a job execution instruction to the user terminal 5 (process P3).

Figure 9A:
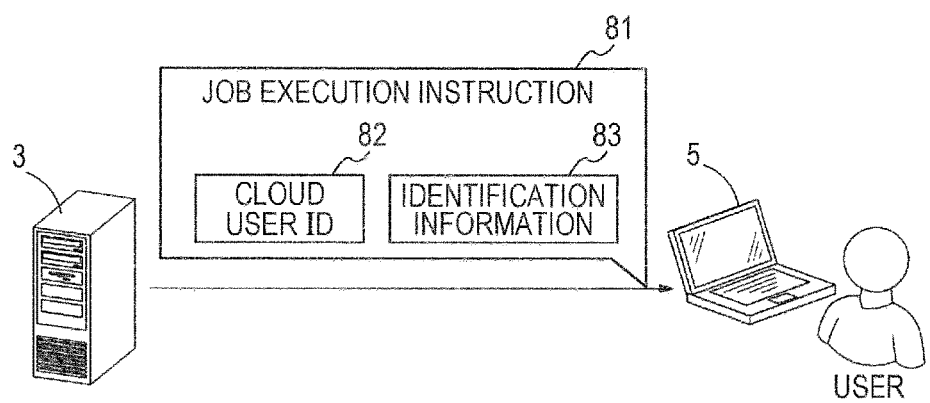
FIGS. 9A and 9B are diagrams showing an example of a job execution instruction.
Figure 9B:
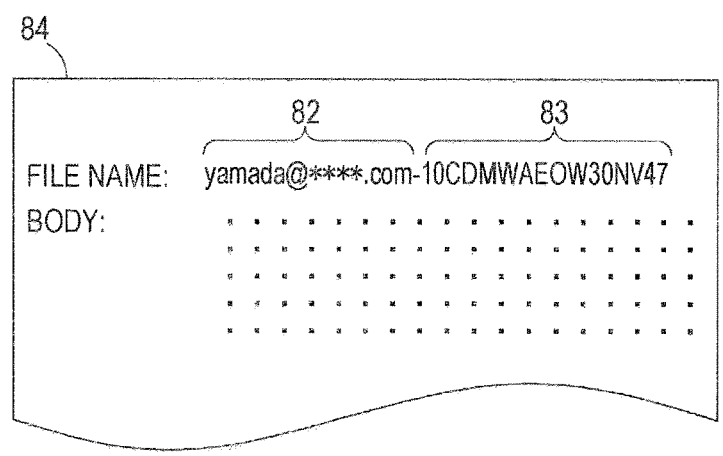

FIGS. 9A and 9B are diagrams showing an example of a job execution instruction 81 that is transmitted from the cloud server 3 to the user terminal 5. As shown in FIG. 9A, for example, the job execution instructing unit 23 transmits the cloud user ID 82 of the user accessing the cloud server 3 to perform the introduction process, and the job execution instruction 81 containing identification information 83 such as a temporary token, to the user terminal 5. When the web page is transmitted from the web page providing unit 18 to the user terminal 5, the job execution instructing unit 23 embed the cloud user ID 82 of the user and the identification information 83 such as a temporary token in a predetermined format in the page title of the web page, or in the file name of the file 84 to be printed, as shown in FIG. 9B. In this case, when the job execution instruction 81 is transmitted to the user terminal 5, the job execution instruction 81 containing the cloud user ID 82 and the identification information 83 is transmitted to the user terminal 5 without fail simply by designating the file name of the file 84 to be printed.

Referring back to FIG. 6, when the job execution instruction 81 is transmitted from the cloud server 3 to the user terminal 5, the printer driver 43 in the user terminal 5 is automatically activated, and a print job based on the job execution instruction 81 from the cloud server 3 is transmitted from the user terminal 5 to the image processing device 6 (process P4). Receiving the print job from the user terminal 5, the image processing device 6 executes the print job to output a print-out (process P5), and generates user reference information in which the cloud user ID and the MFP user ID are associated with each other (process P6).

Figure 10:
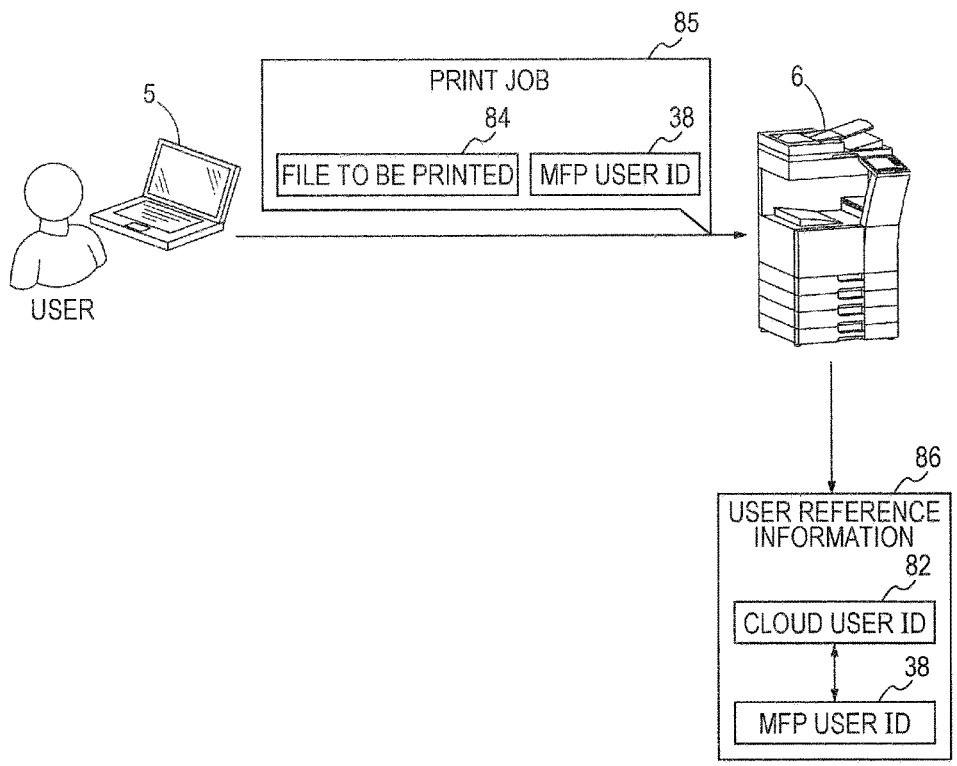
FIG. 10 is a diagram showing the concept applied to a process that starts from transmission of a print job from the user terminal and ends with generation of user reference information in the image processing device.

FIG. 10 is a diagram showing the concept applied to the process that starts from the transmission of a print job 85 from the user terminal 5 and ends with the generation of user reference information 86 in the image processing device 6. When transmitting the print job 85 to the image processing device 6, the user terminal 5 generates the print job 85 including the file 84 to be printed and the MFP user ID 38, and transmits the print job 85. In the file name of the file 84 to be printed, the cloud user ID 82 of the user and the identification information 83 such as a temporary token in the predetermined format are embedded as described above. Receiving the print job 85, the image processing device 6 determines, from the MFP user ID 38, whether the print job 85 is a job of a legitimate user. If the print job 85 is a job of a legitimate user, the image processing device 6 extracts the cloud user ID 82 and the identification information 83 from the file name of the file 84 to be printed. The image processing device 6 then generates the user reference information 86 in which the cloud user ID 82 and the MFP user ID 38 are associated with each other, as shown in FIG. 10. The identification information 83 is further attached to this user reference information 86.

Figure 11:
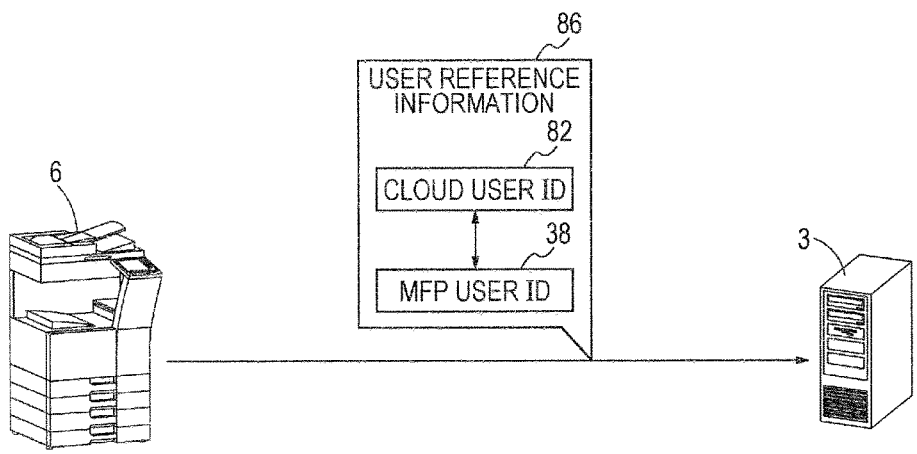
FIG. 11 is a diagram showing an example of the user reference information being transmitted from the image processing device to the cloud server.

The image processing device 6 then transmits the user reference information 86 to the cloud server 3 at a predetermined time, as shown in FIG. 6 (process P7). FIG. 11 is a diagram showing an example of the user reference information 86 transmitted from the image processing device 6 to the cloud server 3 at this point of time. As shown in FIG. 11, in the user reference information 86 transmitted from the image processing device 6 to the cloud server 3, the cloud user ID 82 and the MFP user ID 38 are associated with each other. Although not shown in the drawing, the user reference information 86 also includes the identification information 83 such as a temporary token. Because of this, the cloud server 3 can acquire the user reference information 86 associating the cloud user ID 82 and the MFP user ID 38 with each other from the image processing device 6, and can also acquire the identification information 83 issued before the user reference information 86. After acquiring the user reference information 86, the cloud server 3 determines whether the identification information 83 included in the user reference information 86 matches the identification information previously issued, and determines whether the user reference information 86 is legitimate. If the user reference information 86 is legitimate, the cloud server 3 activates the user information managing unit 17, and additionally registers the MFP user ID 38 associated with the cloud user ID 82 into the area of the MFP user ID 14e of the user management information 14, to thus update the user management information 14. Consequently, the cloud user ID 82 and the MFP user ID 38 are associated with each other in the user management information 14.

FIG. 12 is a table showing an example of the user management information 14 updated by the user information managing unit 17. As the processes shown in FIG. 6 are repeated for each new user, the MFP user IDs of the new users registered in the user management information 14 are registered in the respective areas of the MFP user IDs 14e, as shown in FIG. 12, and the cloud user IDs are associated with the MFP user IDs on a user-by-user basis in the user management information 14. As a result, when executing a job in cooperation with the image processing device 6, the cloud server 3 can convert the cloud user ID of the user into the corresponding MFP user ID, and then transmit the job to the image processing device 6. When receiving image data or the like from the image processing device 6, the cloud server 3 can identify the user by converting the MFP user ID into the cloud user ID. Thus, the cloud server 3 can store the image data or the like accurately into the folder of the identifier user.

Figure 13:
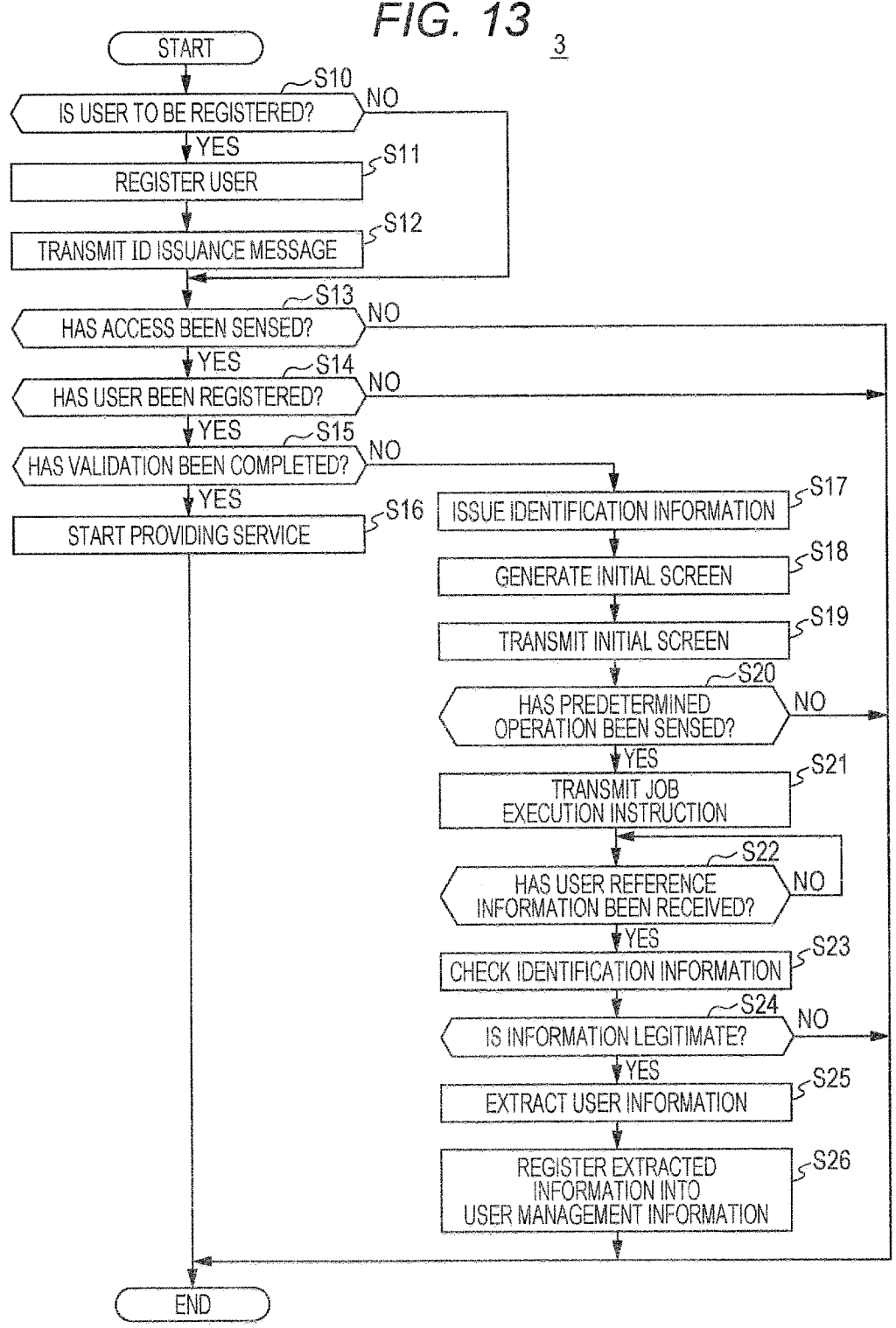
FIG. 13 is a flowchart showing an example of processing procedures to be carried out in the cloud server.

Next, processing procedures to be carried out in the cloud server 3 are described. FIG. 13 is a flowchart showing an example of processing procedures to be carried out in the cloud server 3. This process is to be performed by the control unit 10 of the cloud server 3 as the CPU of the control unit 10 executes the program 13. For example, the cloud server 3 repeats the process shown in the flowchart in FIG. 13 at regular time intervals.

When this process starts, the cloud server 3 first determines whether a new user is to be registered (step S10). If the new user is to be registered (YES in step S10), the cloud server 3 registers the new user (step S11). In this step, the information about the new user is registered into the user management information 14. However, nothing is registered yet in the area of the MFP user ID 14e in the user management information 14. After registering the new user, the cloud server 3 transmits an ID issuance message to the new user (step S12). If the new user is not to be registered (NO in step S10), steps S11 and S12 are skipped.

The cloud server 3 then determines whether access from the user terminal 5 has been sensed (step S13). If any access from the user terminal 5 has not been sensed (NO in step S13), the process being performed by the cloud server 3 comes to an end. If access from the user terminal 5 has been sensed (YES in step S13), on the other hand, the cloud server 3 determines whether the access is from a user registered in the user management information 14 (step S14). If the access is from a user not registered in the user management information 14 (NO in step S14), the process being performed by the cloud server 3 comes to an end. If the access is from a user registered in the user management information 14 (YES in step S14), on the other hand, the cloud server 3 determines whether the cloud user ID of the user has been validated (step S15). If the cloud user ID has already been validated (YES in step S15), the cloud server 3 starts providing a cloud service (step S16).

If the cloud user ID of the user has not been validated yet (NO in step S15), on the other hand, the cloud server 3 issues the identification information 83 such as a temporary token (step S17), and generates a web page to be the initial screen for the use to perform the introduction process (step S18). In this step, the cloud server 3 embeds the cloud user ID 82 of the user and the identification information 83 in the predetermined format in the page title (file name) of the initial screen. The cloud server 3 then transmits the web page generated as the initial screen for the introduction process, to the user terminal 5 (step S19). After that, the cloud server 3 determines whether a predetermined operation has been performed by the user (step S20). In this step, a check is made to determine whether the button 72 to consent to the terms of use has been operated by the user, for example. If any predetermined operation has not been performed yet (NO in step S20), the process being performed by the cloud server 3 comes to an end. If a predetermined operation has been performed by the user (YES in step S20), on the other hand, the cloud server 3 transmits the job execution instruction 81 designating the file name of the file 84 to be printed, to the user terminal 5 (step S21). In this manner, the job execution instruction 81 containing the cloud user ID 82 and the identification information 83 is transmitted to the user terminal 5.

After that, the cloud server 3 stands by until receiving the user reference information 86 from the image processing device 6 (step S22). When receiving the user reference information 86 (YES in step S22), the cloud server 3 checks the identification information 83 (step S23), and determines whether the user reference information 86 is legitimate (step S24). If the identification information 83 does not match the identification information previously issued, and the user reference information 86 is determined not to be legitimate (NO in step S24), the process being performed by the cloud server 3 comes to an end. If the user reference information 86 is determined to be legitimate (YES in step S24), on the other hand, the cloud server 3 extracts the two pieces of user information (the cloud user ID and the MFP user ID) associated with each other in the user reference information 86 (step S25), and registers the cloud user ID and the MFP user ID remaining associated with each other, into the user management information 14 (step S26).

As the above described process is performed in the cloud server 3, a print job containing the identification information 83 in addition to the cloud user ID 82 and the MFP user ID 38 can be transmitted to the image processing device 6 via the user terminal 5 at the time of the first access from a new user, without making the new user aware of the transmission. Acquiring the cloud user ID 82 and the MFP user ID 38 associated with each other by the image processing device 6, the cloud server 3 updates the user management information 14. Thus, the cloud server 3 can automatically generate the information in which the cloud user ID 82 and the MFP user ID 38 are associated with each other.

Figure 14:
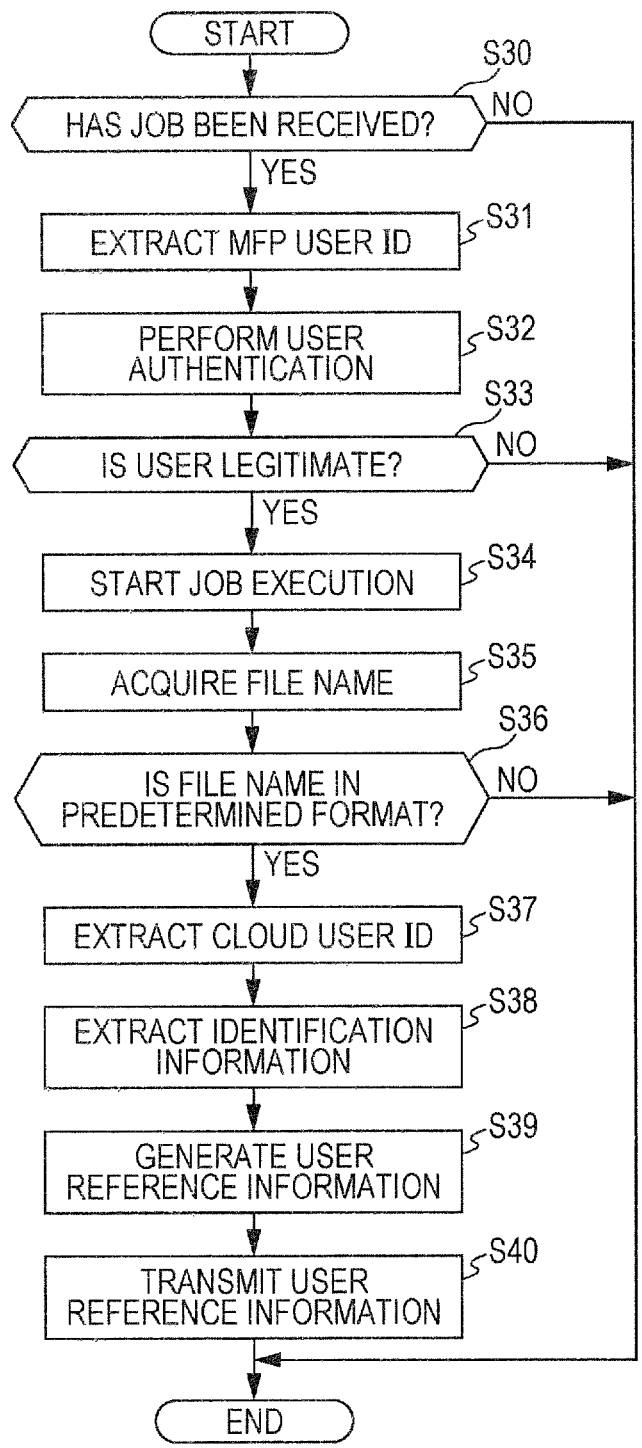
FIG. 14 is a flowchart showing an example of processing procedures to be carried out in the image processing device.

Next, processing procedures to be carried out in the image processing device 6 are described. FIG. 14 is a flowchart showing an example of processing procedures to be carried out in the image processing device 6. This process is to be performed by the control unit 50 of the image processing device 6 as the CPU of the control unit 50 executes the program 57. For example, the image processing device 6 repeats the process shown in the flowchart in FIG. 14 at regular time intervals.

When this process starts, the image processing device 6 first determines whether a job has been received (step S30). If any job has not been received yet (NO in step S30), this process being performed by the image processing device 6 comes to an end. If a job has been received (YES in step S30), the image processing device 6 extracts the MFP user ID from the received job (step S31), and performs user authentication (step S32), to determine whether the job is a job of a legitimate user (step S33). If the received job is not a job of a legitimate user (NO in step S33), this process being performed by the image processing device 6 comes to an end. If the received job is a job of a legitimate user (YES in step S33), on the other hand, the image processing device 6 starts executing the received job (step S34). In the case of a print job, a print-out is output in this process.

The image processing device 6 then acquires the file name of the file 84 included in the received job (step S35), and determines whether the file name is in the predetermined format (step S36). If the file name is in the predetermined format (NO in step S36), this process being performed by the image processing device 6 comes to an end. If the file name is in the predetermined format (YES in step S36), on the other hand, the image processing device 6 extracts the cloud user ID 82 from the file name in the predetermined format (step S37), and further extracts the identification information 83 (step S38). The image processing device 6 then generates the user reference information 86 in which the cloud user ID 82 and the MFP user ID 38 are associated with each other (step S39). At this point in the process, the image processing device 6 adds the identification information 83 extracted from the file name to the user reference information 86. The image processing device 6 then transmits the user reference information 86 to the cloud server 3 (step S40).

As the above process is performed in the image processing device 6, the image processing device 6 can extract the cloud user ID 82 and the MFP user ID 38 of the user from the job received from the user terminal 5, automatically generate the user reference information 86 in which the cloud user ID 82 and the MFP user ID 38 are associated with each other, and transmit the user reference information 86 to the cloud server 3. Furthermore, the image processing device 6 can perform the process, without making the user aware of the process. Thus, the work load on the user can be reduced.

In the above described embodiment, the image processing device 6 generates the user reference information 86, accesses the cloud server 3 in accordance with the cloud information 59, and transmits the user reference information 86 to the cloud server 3. However, there may be other embodiments in which the image processing device 6 transmits the user reference information 86 to the cloud server 3. For example, the cloud server 3 may access the image processing device 6, to determine whether the user reference information 86 has been generated in the image processing device 6. If the user reference information 86 has been generated, the cloud server 3 may acquire the user reference information 86 from the image processing device 6. In such a case, the cloud server 3 may acquire the user reference information 86 from the image processing device 6 by regularly accessing the image processing device 6 registered in the user management information 14. Alternatively, the cloud server 3 may acquire the user reference information 86 from the image processing device 6 by accessing the image processing device 6 at a predetermined time after the job execution instruction 81 is sent to the user terminal 5.

In a case where the cloud server 3 accesses the image processing device 6 to acquire the user reference information 86 as described above, job history information generated in the course of execution of jobs in the image processing device 6 may be used as the user reference information 86. FIG. 15 is a table showing an example of the job history information 89 in that case. In the course of execution of jobs, the image processing device 6 generates the job history information 89 in which the print dates of execution of print jobs, the file names of the files 84 printed in the print jobs, user IDs (MFP user IDs), and print statuses are recorded as shown in FIG. 15. In the job history information 89, the file names of the printed files 84 are recoded, as well as the user IDs (MFP user IDs) of the users who executed the jobs. In this structure, the job history information 89 associates the cloud user ID 82 and the MFP user ID 38 of a user with each other, like the user reference information 86. In view of this, when acquiring the user reference information 86 by accessing the image processing device 6, the cloud server 3 may acquire the job history information 89 shown in FIG. 15 as the user reference information 86.

As described above, the image processing system 1 of this embodiment includes: the cloud server 3 that provides services after identifying the user from the first user information (the cloud user ID, for example) assigned to each user; the image processing device 6 that can execute a job after identifying the user from the second user information (the MFP user ID, for example) assigned to each user, and can execute the job in cooperation with the cloud server 3; and the user terminal 5 that stores the second user information in advance. The cloud server 3 includes the user information validating unit 24 that senses access from the user terminal 5 and then validates the first user information. When the user information validating unit 24 validates the first user information, the job execution instruction 81 containing the first user information is transmitted to the user terminal 5, so that a job containing the first user information and the second user information is transmitted from the user terminal 5 to the image processing device 6. Receiving the job transmitted from the user terminal 5, the image processing device 6 extracts the first user information and the second user information from the job, generates the user reference information 86 in which the first user information and the second user information are associated with each other, and transmits the user reference information 86 to the cloud server 3.

In such a structure, when sensing access from the user terminal 5, the cloud server 3 transmits a job to the image processing device 6 via the user terminal 5, without making the user aware of the transmission. In this manner, the first user information registered in the cloud server 3 and the second user information stored in the user terminal 5 can be simultaneously transferred to the image processing device 6, and the user reference information 86 that associates the first user information and the second user information with each other can be automatically generated in the image processing device 6. Consequently, the information that associates the first user information and the second user information with each other can be managed, without causing the manager or a user of the image processing device 6 to perform the operation to associate the first user information and the second user information with each other. Thus, the work load on both the manager and the user can be reduced.

Further, when the cloud server 3 transmits the job execution instruction 81 to the user terminal 5, the temporary identification information 83 is added to the job execution instruction 81. After acquiring the user reference information 86, the cloud server 3 can determine whether the user reference information 86 is legitimate in accordance with the identification information 83. Thus, wrong association between the first user information and the second user information, and unauthorized registration of the first user information and the second user information can be prevented.

After transmitting the user reference information 86 to the cloud server 3, the image processing device 6 deletes the user reference information 86. By doing so, the image processing device 6 can have a larger storage area open for new user reference information 86, and thus, efficiently use the storage area.

Although embodiments of the present invention has been described so far, embodiments of the present invention is not limited to the above embodiment, and various modifications can of course be made to it.

For example, in the above described embodiment, the temporary identification information 83 is added to the job execution instruction 81 when the cloud server 3 transmits the job execution instruction 81 to the user terminal 5. However, the addition of the identification information 83 is optional, and the identification information 83 may not be added to the job execution instruction 81.

In the above described embodiments, the first user information is the cloud user ID 82. However, the first user information is not necessarily the cloud user ID 82. For example, the first user information may be information that includes the user name, a password (an initial password), and the like, as well as the cloud user ID 82. In the above described embodiment, the second user information is the MFP user ID 38. However, the second user information is not necessarily the MFP user ID 38. For example, the second user information may be information that includes the user name, a password, and the like, as well as the MFP user ID 38.

In the above described embodiment, the cloud server 3 eventually manages the information that associates the cloud user ID 82 and the MFP user ID 38 with each other in most cases. However, such information may be managed in the image processing device 6, instead of the cloud server 3. In that case, the image processing device 6 does not need to transmit the user reference information 86 to the cloud server 3.

According to embodiments of the present invention, an associating operation can be performed without making the user aware of the operation, and user information in a cloud server and user information in an image processing device can be associated with each other, while the work load on both the manager and the user is reduced.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:
1. An image processing system comprising:
a cloud server that provides a service after identifying a user using a first user information assigned to the user, the cloud server being provided on an Internet;
an image processing device that executes a function of the image processing device after identifying the user using a second user information assigned to the user, and execute the function in cooperation with the cloud server; and
a user terminal storing the second user information beforehand,
wherein
the cloud server includes:
an access sensing processor that senses access from the user terminal;
a user information validating processor that validates the first user information, as the access from the user terminal is sensed by the access sensing processor; and
a job execution instructing processor that causes the user terminal to transmit a first job containing the first user information and the second user information to the image processing device, by transmitting a first job execution instruction containing the first user information to the user terminal when the first user information is validated by the user information validating processor, and
the image processing device includes:
a job receiving processor that receives the first job transmitted from the user terminal; and
a user information extracting processor that extracts the first user information and the second user information from the first job received by the job receiving processor, and generate user reference information associating the first user information and the second user information with each other.

2. The image processing system according to claim 1, wherein the job execution instructing processor activates a driver program in the user terminal by transmitting the first job execution instruction to the user terminal, and causes the driver program to automatically generate the first job containing the first user information and the second user information, and transmit the first job to the image processing device.

3. The image processing system according to claim 1, wherein
the image processing device further includes
an information transmitting processor that transmits the user reference information to the cloud server, and
the cloud server further includes:
a user information managing processor that acquires the user reference information from the image processing device, and generate and manage user management information associating the first user information and the second user information with each other in accordance with the user reference information; and
a user information identifying processor that identifies the second user information corresponding to the first user information or the first user information corresponding to the second user information in accordance with the user management information, when the cloud server executes the function in cooperation with the image processing device.

4. The image processing system according to claim 3, wherein,
when transmitting the first job execution instruction containing the first user information to the user terminal, the job execution instructing processor generates temporary identification information, and transmits a second job execution instruction further containing the identification information to the user terminal, to cause the user terminal to transmit a second job containing the first user information, the second user information, and the identification information to the image processing device, when the second job received by the job receiving processor contains the identification information, the user information extracting processor adds the identification information to the user reference information, and when the user reference information acquired from the image processing device contains the identification information, and the identification information is legitimate, the user information managing processor generates the user management information associating the first user information and the second user information with each other.

5. The image processing system according to claim 3, wherein, as the user reference information is generated by the user information extracting processor, the information transmitting processor accesses the cloud server and transmits the user reference information to the cloud server.

6. The image processing system according to claim 3, wherein the user information managing processor acquires the user reference information from the image processing device by regularly accessing the image processing device.

7. The image processing system according to claim 3, wherein, after transmitting the first job execution instruction to the user terminal, the user information managing processor acquires the user reference information from the image processing device by accessing the image processing device at a predetermined time.

8. A cloud server providing a service after identifying a user using a first user information assigned to a user and executing a function of an image processing device in cooperation with the image processing device in a local network, the cloud server being provided on an Internet, the cloud server comprising:
    an access sensing processor that senses access from a user terminal being operated by the user to whom the first user information is assigned;
    a user information validating processor that validates the first user information, as the access from the user terminal is sensed by the access sensing processor; and
    a job execution instructing processor that causes the user terminal to transmit a first job containing the first user information and second user information to the image processing device, by transmitting a first job execution instruction containing the first user information to the user terminal when the first user information is validated by the user information validating processor, the second user information is designed for causing the image processing device to execute the first job,
    wherein:
    the second user information is stored beforehand by the user terminal;
    the first job transmitted from the user terminal is received by the image processing device,
    the first user information and the second user information are extracted from the first job by the image processing device, and
    a user reference information that associates the first user information and the second user information with each other is generated by the image processing device.

9. The cloud server according to claim 8, wherein the job execution instructing processor activates a driver program in the user terminal by transmitting the first job execution instruction to the user terminal, and causes the driver program to automatically generate the first job containing the first user information and the second user information, and transmit the first job to the image processing device.

10. The cloud server according to claim 8, further comprising:
    a user information managing processor that acquires user reference information associating the first user information and the second user information with each other from the image processing device after causing the user terminal to transmit the first job containing the first user information and the second user information to the image processing device, and generate and manage user management information associating the first user information and the second user information with each other in accordance with the user reference information; and
    a user information identifying processor that identifies the second user information corresponding to the first user information or the first user information corresponding to the second user information in accordance with the user management information, when the cloud server executes the function in cooperation with the image processing device.

11. The cloud server according to claim 10, wherein, when transmitting the first job execution instruction containing the first user information to the user terminal, the job execution instructing processor generates temporary identification information, and transmits a second job execution instruction further containing the identification information to the user terminal, to cause the user terminal to transmit a second job containing the first user information, the second user information, and the identification information to the image processing device, and when the user reference information acquired from the image processing device contains the identification information, and the identification information is legitimate, the user information managing processor generates the user management information associating the first user information and the second user information with each other.

12. The cloud server according to claim 10, wherein the user information managing processor acquires the user reference information from the image processing device by regularly accessing the image processing device.

13. The cloud server according to claim 10, wherein, after transmitting the first job execution instruction to the user terminal, the user information managing processor acquires the user reference information from the image processing device by accessing the image processing device at a predetermined time.

14. An image processing device executing a function of the image processing device in cooperation with a cloud server providing a service after identifying a user using a first user information assigned to the user, the image processing device executing the function after identifying the user using a second user information assigned to the user, the image processing device comprising:
    a job receiving processor that receives a job transmitted from a user terminal being operated by the user; and
    a user information extracting processor that extracts the first user information and the second user information from the job received by the job receiving processor, and generate user reference information associating the first user information and the second user information with each other, wherein:

the second user information is stored beforehand by the user terminal;

the first user information is validated by the cloud server, as access from the user terminal is sensed by the cloud server, the cloud server causes the user terminal to transmit the job to the image processing device by transmitting a job execution instruction containing the first user information to the user terminal when the first user information is validated, and the second user information causes the image processing device to execute the job.

15. The image processing device according to claim 14, wherein, when the job received by the job receiving processor contains temporary identification information, the user information extracting processor adds the identification information to the user reference information.

16. The image processing device according to claim 14, further comprising:

an information transmitting processor that transmits the user reference information to the cloud server.

17. The image processing device according to claim 16, wherein, as the user reference information is generated by the user information extracting processor, the information transmitting processor accesses the cloud server and transmits the user reference information to the cloud server.

18. A non-transitory recording medium storing a computer readable program to be executed in a cloud server providing a service after identifying a user using a first user information assigned to the user and executing a function of an image processing device in cooperation with the image processing device in a local network, the cloud server being provided on an Internet, the program causing the cloud server to carry out:

sensing access from a user terminal being operated by the user to whom the first user information is assigned;

validating the first user information, as the access from the user terminal is sensed; and causing the user terminal to transmit a job containing the first user information and second user information to the image processing device, by transmitting a job execution instruction containing the first user information to the user terminal when the first user information is validated, the second user information being designed for causing the image processing device to execute the job, wherein:

the second user information is stored beforehand by the user terminal, the job transmitted from the user terminal is received by the image processing device, the first user information and the second user information are extracted from the job by the image processing device, and a user reference information that associates the first user information and the second user information with each other is generated by the image processing device.

19. A non-transitory recording medium storing a computer readable program to be executed in an image processing device executing a function of the image processing device in cooperation with a cloud server providing a service after identifying a user using a first user information assigned to the user, the image processing device executing the function after identifying the user using a second user information assigned to the user, the program causing the image processing device to carry out:

receiving a job transmitted from a user terminal being operated by the user; and extracting the first user information and the second user information from the received job, and generating user reference information associating the first user information and the second user information with each other, wherein:

the second user information is stored beforehand by the user terminal;

the first user information is validated by the cloud server, as access from the user terminal is sensed by the cloud server, the cloud server causes the user terminal to transmit the job to the image processing device by transmitting a job execution instruction containing the first user information to the user terminal when the first user information is validated, and the second user information causes the image processing device to execute the job.

* * * * *